A. L. McGREGOR.
AUTOMOBILE BUMPER.
APPLICATION FILED AUG. 10, 1916.
1,257,266.
Patented Feb. 19, 1918.
2 SHEETS—SHEET 1.
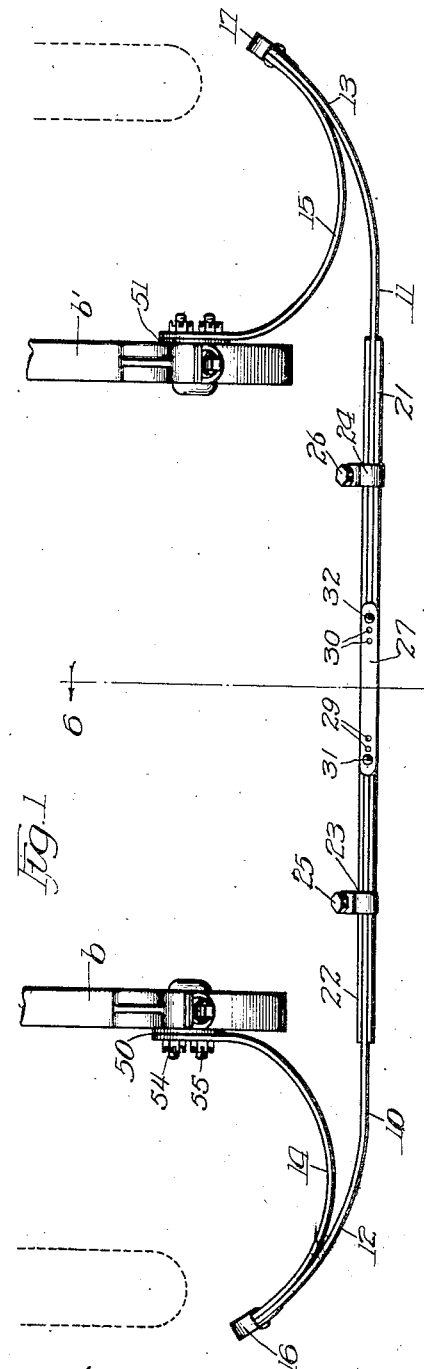
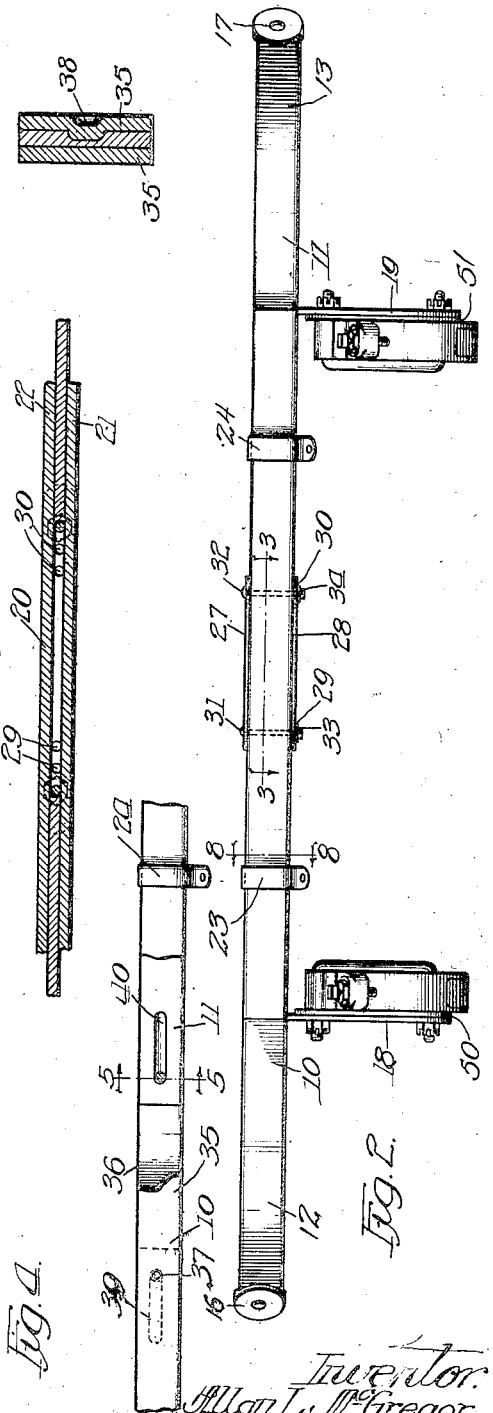

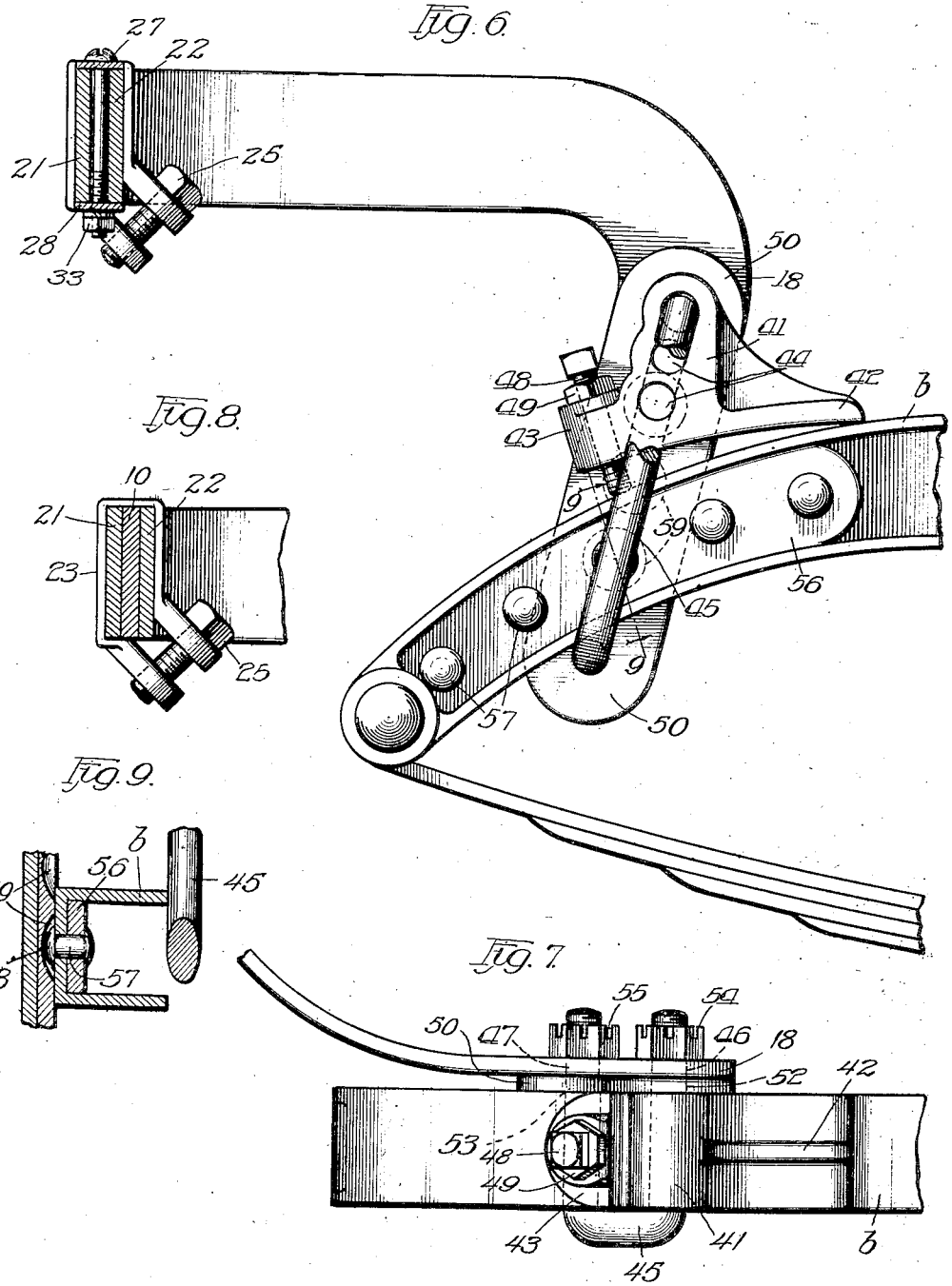

UNITED STATES PATENT OFFICE.

ALLAN L. McGREGOR, OF CHICAGO, ILLINOIS.

AUTOMOBILE-BUMPER.

1,257,266.  Specification of Letters Patent.  Patented Feb. 19, 1918.

Application filed August 10, 1916. Serial No. 114,089.

*To all whom it may concern:*

Be it known that I, ALLAN L. McGREGOR, a citizen of the United States, and a resident of Chicago, in the county of Cook and State of Illinois, have invented certain new and useful Improvements in Automobile-Bumpers, of which the following is a specification.

My invention relates to automobile bumpers, particularly to bumpers which are secured to the downwardly curved front ends of the chassis side beams.

In different builds of vehicles the chassis side beams are spaced different distances apart and the curvature of the ends varies, and likewise there is variation in the depth and width of the side beams. The general object of my invention is therefore to produce a bumper structure which can be readily adjusted to accommodate itself to different distances between side beams and to accommodate the varying curvature, depth or thicknesses of the side beams. The invention involves various features of construction and arrangement, all of which are clearly shown on the accompanying drawings forming part of the specification.

In these drawings—

Figure 1 is a plan view of the front ends of vehicle side beams and my improved bumper structure applied thereto, Fig. 2 is a front view of the parts shown in Fig. 1, Fig. 3 is an enlarged sectional view on plane 3—3, Fig. 2, Fig. 4 is a front view of the central part of the bumper structure showing a modified arrangement, Fig. 5 is an enlarged sectional view on plane 5—5, Fig. 4, Fig. 6 is an enlarged sectional view on plane 6—6, Fig. 1, Fig. 7 is a plan view of the parts shown in Fig. 6, Fig. 8 is an enlarged sectional view on plane 8—8, Fig. 2, and Fig. 9 is a sectional view on plane 9—9, Fig. 6.

The bumper structure shown comprises two similar front members 10 and 11 in the form of flat bars curved gradually rearwardly at their outer ends 12 and 13, the curved bars or bows 14 and 15 being secured at their outer ends to the ends 12 and 13 by suitable fittings or caps 16 and 17, the inner ends 18 and 19 of the bows being deflected downwardly preferably at an obtuse angle with the bows.

Describing now the mechanism for adjusting the bumper for differently spaced apart chassis side beams, the inner ends of the bumper sections 10 and 11 fall short of meeting to leave a gap 20, and this gap is bridged by front and rear bars 21 and 22 respectively which preferably are of the same height as the bumper sections 10 and 11. The sections 10 and 11 and the bars 21 and 22 are secured together by clamping straps 23 and 24 and bolts 25 and 26. In Figs. 1, 2, 3 and 6 one form of means is shown for securing the sections 10 and 11 and the bars against relative transverse or vertical movement. As shown, the upper and lower edges of the bars are engaged by plates 27 and 28 which are of sufficient length to bridge the gap 20 and to overlie the inner ends of the sections 10 and 11 a distance. Through the holes 29 and 30 in the ends of the plates and through the gap 20 bolts 31 and 32 pass to be drawn up by nuts 33 and 34 so that the bars and the inner ends of the sections 10 and 11 will be securely clamped against relative vertical displacement. To permit widening or narrowing of the bumper structure to fit differently spaced apart chassis side beams there may be several openings 29 and 30 for receiving the bolts. To adjust the bumper structure for the proper width the clamps 23 and 24 and the plates 27 and 28 are loosened and after the proper distance has been obtained between the ends 18 and 19 of the bumper structure the clamps are tightened and the plates are secured. The bars 21 and 22 also assist in strengthening and stiffening the bumper sections 10 and 11. The bolts 31 and 32 will also serve as abutments for the inner ends of the front sections 10 and 11 so that when the bumper structure is struck diagonally or from the side the shock will be transmitted through the plates 27 and 28 to the other side of the bumper structure to be distributed over the entire structure.

In Figs. 4 and 5 a modified arrangement is shown for locking the bars and bumper sections against relative vertical movement. The gap 20 between the sections 10 and 11 is bridged by the front and rear bars 35 and 36, the front bar having rearwardly deflected sections 37 and 38 forming projections for lugs for engaging in the longitud nally extending slots or grooves 39 and 40 formed in the bumper sections 10 and 11 near the inner ends thereof. Engagement of the projections in the grooves when the clamps 23 and 24 are tightened will prevent relative vertical displacement of the sections 10 and 11 and the bars. When the clamps are loosened the bumper sections may be readily adjusted to get the proper width of bumper structure, the projections sliding in the grooves during such adjustment.

The mechanism for securing the bumper structure to the vehicle side beams is best shown in Figs. 6, 7 and 9. For each vehicle side beam a fitting 41 is provided having the rearwardly extended base section 42 and a front lug 43. Each fitting has a plurality of holes 44, one above the other, for receiving the upper limb of a U-bolt or strap 45. The ends 18 and 19 of the bumper structure bows have holes 46 at their upper ends for registering with the holes 44 of the fittings, and at their lower ends have holes 47 for receiving the lower limb of the U-bolt. The fittings 41 rest on the upper side of the curved front ends of the vehicle side beams $b$ and $b'$, and extending through the lug 43 of each fitting is a jack screw 48 engaged by a lock nut 49. The ends 18 and 19 of the bumper structure extend downwardly along the outsides of the side beams but spaced sufficiently therefrom to leave room for plates 50 and 51 which at their upper ends have holes 52 for registering with the holes 44 of the fittings 41 and the holes 46 in the ends 18 and 19, and at their lower ends the plates have holes 53 for registering with the holes 47 at the lower part of the ends 18 and 19, the upper and lower limbs of the U-bolt passing through the holes 52 and 53 respectively. When the U-bolts are drawn up tightly by means of their nuts 54 and 55 the bumper ends 18 and 19 and the plates 50 and 51 will be securely clamped to the fittings 41 and the side beams $b$ and $b'$ will be securely clamped between the yoke and the plates 50 and 51, the lower limb of the U-bolt engaging against the under sides of the side beams and the fittings 41 resting with their rear edges and the lower ends of the jack screws against the upper sides of the side beams.

By means of the jack screws 48 adjustment can be made for seating the fittings 41 at such angle on the curved upper surfaces of the vehicle side beams that the front sections 10 and 11 of the bumper structure will be in a vertical plane. When the bumper structure is applied to a vehicle the fittings, plates and U-bolts are assembled and before the U-bolt nuts are drawn tight the fittings are slid longitudinally along the side beams and the screws 48 adjusted until the front bumper sections 10 and 11 are in the desired position and the lower limbs of the U-bolts engage with the under side of the side beams. The U-bolt nuts are then drawn up tight to clamp the parts in adjusted position. After such tightening of the U-bolts the jack screws 48 can be given an additional tightening turn to increase the vertical clamping engagement with the side beams and then the bumper structure will be rigidly locked to the side beams, particularly against rearward displacement thereon. The U-bolts will of course take care of the different widths of side beams and the screws 48 will permit compensation for ordinary changes in curvature. If the differences in curvature are more than ordinary, different sizes of U-bolts can be used and their upper limbs extended through the corresponding holes 41 in the fittings and the registering holes in the plates 50 and 51 and the bumper holes 18 and 19. In some vehicles the curved front ends of the side beams are strengthened by plates 56 engaging inside the beams and secured against the inner sides thereof by rivets 57 so that the rivet heads 58 will be on the inner faces of the beams against which the plates 50 and 51 engage. To accommodate such rivet heads and to permit the plates 50 and 51 to rest against the beams, pockets 59 are provided in the plates for receiving the rivet heads. Such engagement of the plates with the rivet heads will further strengthen the connections of the bumper ends with the side beams. It is evident that the plates 50 and 51 could be omitted and the ends 18 and 19 applied directly to the side beams with pockets cut therein to accommodate the rivets. Such pockets would, however, weaken the ends 18 and 19, and it is therefore preferable to insert the plates 50 and 51, these greatly strengthening the ends 18 and 19.

I thus provide simple and efficient means for adapting a bumper structure for the variable dimensions of vehicles, adjustment being very readily made and the bumper structure being rigidly supported in adjusted position. I do not desire to be limited to the exact constructions and arrangements shown as modifications are no doubt possible which would still come within the scope of the invention.

I claim as follows:

1. In a bumper structure, the combination of two halves comprising front sections extending laterally toward each other and rear sections adapted to be secured at their ends to vehicle side beams, front and rear bars bridging the gap between the front sections, clamps securing together said front sections and the bars against relative longitudinal displacement, and means independent of said clamps for securing said front sections and bars together against transverse displacement.

2. In a bumper structure, the combination of two halves comprising front sections extending toward each other and rear sections adapted at their inner ends to be secured to a vehicle, said front sections being in the form of flat bands arranged in a common vertical plane, a bar bridging the gap between said front sections, detachable clamps for securing said bar and front sections against relative longitudinal displacement, and means independent of said clamps for detachably securing said bar and front sections together against relative vertical displacement.

3. In a bumper structure, the combination of two similar halves comprising front sections extending toward each other and rear sections adapted at their ends to be secured to a vehicle, the front sections extending horizontally toward each other and separated by a gap, front and rear bars bridging said gap, detachable clamps for securing the bars and front sections together against relative longitudinal displacement, upper and lower plates bridging said gap and engaging the upper and lower edges respectively of the bars and said front sections, and bolts passing through holes in said plates and through said gap for clamping said front sections and bars against relative vertical displacement.

In witness whereof I hereunto subscribe my name this 7th day of August, A. D., 1916.

ALLAN L. McGREGOR.